US010054210B2

(12) United States Patent
Hentsch et al.

(10) Patent No.: US 10,054,210 B2
(45) Date of Patent: Aug. 21, 2018

(54) ROTOR FOR A CAM PHASER WITH IMPROVED PROPERTIES

(71) Applicant: Hilite Germany GmbH, Marktheidenfeld (DE)

(72) Inventors: Florian Hentsch, Gruibingen (DE); Karl-Heinz Isenberg, Trier (DE); Stefan Klotz, Aichtal (DE); Rainer Maier, Wolfschlugen (DE); Jens Bartzsch, Waldorfhaeslach (DE)

(73) Assignee: Hillte Germany GmbH, Marktheidenfeld (DE)

( * ) Notice: Subject to any disclaimer, the term of this patent is extended or adjusted under 35 U.S.C. 154(b) by 0 days.

(21) Appl. No.: 14/926,779

(22) Filed: Oct. 29, 2015

(65) Prior Publication Data
US 2016/0108913 A1 Apr. 21, 2016

Related U.S. Application Data

(63) Continuation of application No. PCT/EP2014/063936, filed on Jul. 1, 2014.

(30) Foreign Application Priority Data

| Jul. 5, 2013 | (DE) | .......................... 10 2013 107 132 |
| Jul. 5, 2013 | (DE) | .......................... 10 2013 107 133 |
| Jul. 12, 2013 | (DE) | .......................... 10 2013 107 431 |

(51) Int. Cl.
*F01L 13/00* (2006.01)
*F16H 53/02* (2006.01)
(Continued)

(52) U.S. Cl.
CPC .............. *F16H 53/02* (2013.01); *F01L 1/047* (2013.01); *F01L 1/34* (2013.01); *F01L 1/3442* (2013.01); *F04C 15/0061* (2013.01); *F16H 53/04* (2013.01); *F01L 2001/34479* (2013.01); *F01L 2103/00* (2013.01); *F01L 2820/01* (2013.01)

(58) Field of Classification Search
CPC .......... F16H 53/02; F16H 53/04; F01L 1/047; F01L 1/34; F01L 2001/34479; F01L 2103/00; F01L 2820/01; F04C 15/0061
See application file for complete search history.

(56) References Cited

U.S. PATENT DOCUMENTS

| 2009/0235884 | A1* | 9/2009 | Fischer | ................. F01L 1/3442 123/90.17 |
| 2012/0227692 | A1* | 9/2012 | Hoyer | .................. F01L 1/3442 123/90.15 |
| 2012/0298060 | A1 | 11/2012 | Boese et al. | |

FOREIGN PATENT DOCUMENTS

| DE | 10356907 A1 | 7/2005 |
| DE | 102005013141 A1 | 9/2006 |

(Continued)

*Primary Examiner* — Vicky A Johnson
(74) *Attorney, Agent, or Firm* — Von Rohrscheidt Patents (57) ABSTRACT

The invention relates to a rotor for a cam phaser wherein the rotor is provided for a rotation about a rotation axis and includes at least one first vane essentially radially extending away from the rotation axis, wherein a surface of the rotor includes at least one first face, at least one second face that is parallel to the first face, at least one first outer circumferential partial surface of the first vane, wherein a protrusion profile is provided at the surface. The invention also relates to a method for producing the rotor.

16 Claims, 10 Drawing Sheets

(51) Int. Cl.
*F01L 1/047* (2006.01)
*F01L 1/344* (2006.01)
*F04C 15/00* (2006.01)
*F16H 53/04* (2006.01)
*F01L 1/34* (2006.01)

(56) References Cited

FOREIGN PATENT DOCUMENTS

| DE | 102005038364 | 2/2007 |
| DE | 102010008006 A1 | 8/2011 |
| JP | H11182216 | 7/1999 |

* cited by examiner

ROTOR FOR A CAM PHASER WITH IMPROVED PROPERTIES

RELATED APPLICATIONS

This application is a continuation of International Application PCT/EP2014/063936 filed on Jul. 1, 2014 claiming priority from German patent applications
DE 10 2013 107 133.3 filed on Jul. 5, 2013,
DE 10 2013 107 132.5 filed on Jul. 5, 2013, and
DE 10 2013 107 431.6 filed on Jul. 12, 2013,
all of which are incorporated in their entirely by this reference.

FIELD OF THE INVENTION

The invention relates to a rotor for a cam phaser.

BACKGROUND OF THE INVENTION

Different types of cam phasers are known in the art. One type are hydraulic cam phasers. Hydraulic cam phasers can be configured for example as cam phasers which operate according to the vane pump principle. Cam phasers operating according the vane pump principle are known for example from embodiments in which two components that are moveable relative to each other are configured as a stator and a rotor, wherein the stator has a number of vanes which extend away from the rotation axis of the stator. The stator and the rotor in such cam phasers are typically positioned coaxial relative to each other, wherein for example a rotor arranged in a cavity formed by the stator forms at least two hydraulic cavities together with the stator. For example filling one of the hydraulic chambers in this type of embodiment with a suitable fluid causes a rotation of the rotor through a pressure imparting the vane and thus causes an adjustment of a rotation angle of the cam shaft and thus causes a change of the valve opening and closing times controlled by the individual cams that are arranged on the cam shaft.

BRIEF SUMMARY OF THE INVENTION

It is an object of the invention to provide a rotor for a cam phaser which has improved properties compared to known rotors for cam phasers.

The object is achieved with by a rotor for a cam phaser wherein the rotor is provided for a rotation about a rotation axis and includes at least one first vane essentially radially extending away from the rotation axis, wherein a surface of the rotor includes at least one first face, at least one second face that is parallel to the first face, at least one first outer circumferential partial surface of the first vane, wherein a protrusion profile is provided at the surface.

The object is also achieved by a method for producing a rotor with a protrusion profile configured at a surface of the rotor, the method comprising the steps forming the rotor wherein the rotor includes a first vane,
a surface including a first face, a second face that is parallel to the first face and a first outer circumferential partial surface of the first vane; forming a protrusion profile at the surface; and post forming the protrusion profile with pressure loading after forming the protrusion profile.

Other advantageous embodiments and improvements can be derived from the dependent claims, the subsequent descriptions and the drawing figure. One or plural features from the claims, the description and the drawing figures can be combined with one or plural other features to form additional embodiments of the invention. In particular also one or plural features from the independent claims can be replaced by one or plural other features from the description and/or the drawing figures. The proposed claims merely constitute a draft definition of the subject matter without limiting the subject matter.

A rotor for a cam phaser is proposed. The rotor is provided for a rotation about a rotation axis. The rotor includes at least one vane which extends from a central portion of the rotor essentially in a direction oriented radially away from the rotation axis. The rotor includes a surface including:
   at least one first face,
   at least one second face that is parallel to the at least one first face,
   at least one first outer circumferential partial surface of the first vane.

A positive protruding profile is configured at the surface of the rotor. The term surface of the rotor shall be interpreted in that the surface includes all partial surfaces of the rotor. Thus, the surface can also include plural different surfaces which can be arranged for example at different orientations relative to each other and which can be separated from each other by sharp edges.

With reference to the statement that the second face is oriented parallel to the first face smaller deviations from an optimum parallel orientation shall be included. Thus, it shall be included for example that the second face is tilted at an angle of 5° relative to the first face. It can be furthermore provided that the tilt is less than 2°.

In an advantageous embodiment the term parallel means that there is no tilt of the first face relative to the second face within the range of typical manufacturing tolerances.

In an advantageous embodiment of the rotor it is provided that the first face and the second face are parallel to one another. Within a range of values of 0.02 mm to 0.03 mm, wherein 0.02 mm and 0.03 mm shall be respectively included. In another advantageous embodiment it can be provided that the parallel orientation is in a range of 0.02 mm to 0.03 mm, wherein the values 0.020 mm and 0030 mm shall be included in the stated range.

In another embodiment of the rotor it can be provided that a tolerance of a height of the rotor is within a range of 0.012 mm to 0.020 mm. The values 0.012 mm and 0.020 mm shall be included in the range.

The term height designates a distance of the respective furthest extensions of the first face and the second face from one another so that protrusions or shapes of the rotor arranged at the face increase the height of the rotor.

The term protrusion profile designates an entirety of one or plural structures which rise out of the surface from a base plane of the surface. The protrusion profile can be characterized in that one or plural structures can be elements of the protrusion profile. The one or plural structures can be arranged on the surface in an even or also in an uneven arrangement. Furthermore the structures of the protrusion profile can differ from each other with respect to their height and/or lateral extension, but also a provision of identical structures which only differ with respect to positioning can be provided. It can be provided for example that the protrusion profile includes structures which are linked together. It can also be provided in an embodiment of the rotor that the protrusion profile includes structures which are not linked together.

It can be provided for example that the protrusion profile includes structures which are arranged isolated from other structures of the protrusion profile. It can be provided for example that the protrusion profile is configured in knob shaped section structures, spherical section structures, ellipsoid section structures, longitudinal ridge structures, trapezoid and/or cuboid structures. Minor deviations of the recited configurations of the structures, for example in the form of rounded edges shall also be included.

In particular the term protrusion profile designates the entirety of all structures arranged at the surface of the rotor.

In another embodiment of the rotor it can be provided for example that the rotor is joined from two separately produced rotor elements. In particular it can also be provided that the rotor is joined from two identical rotor elements. It is a significant advantage of joining the rotor from two identical rotor elements that fabrication is substantially simplified.

In one embodiment of the rotor it can be provided for example that the protrusion profile includes at least one longitudinal groove profile arranged at the first outer circumferential partial surface and including at least two longitudinal grooves.

The term longitudinal groove relates in particular to the longitudinal groove having a substantially larger extension along a first direction than along its second direction. Thus, it shall be provided in particular that the extension along the first direction exceeds the extension along the second direction by at least 100%.

The term outer partial circumferential surface relates to surfaces which include at least a tangential rotation component of the surface or put differently which would be cut by a beam oriented radially away from the rotation axis.

It can be provided in particular that the first outer circumferential partial surface is for example a partial surface which is arranged in an enveloping surface of a circular cylinder which would be formed during a rotation of a rotor that is shaped accordingly.

In one embodiment it can be provided that at least two longitudinal grooves follow a straight line. Another embodiment can provide that all longitudinal grooves follow a straight extension. In another embodiment it can be provided that two longitudinal grooves of the longitudinal groove profile are oriented parallel to each, other. In another advantageous embodiment it can be provided that all longitudinal grooves of the longitudinal groove profile are oriented parallel to each other.

In another embodiment of the rotor it can be provided for example that at least one longitudinal groove extends along an entire outer circumference partial surface elevation. The term outer circumference partial surface elevation designates an extension of the first outer circumference partial surface in a direction that is parallel to the rotation axis of the rotor. This means that the outer circumference partial surface elevation does not have to be identical at each position of the outer circumference partial surface.

In another embodiment of the rotor it can be provided that at least two longitudinal grooves are oriented in a direction that is parallel to the rotation axis. It can be provided in particular that all longitudinal grooves are oriented in a direction that is parallel to the rotation axis so that all longitudinal grooves follow an axial extension.

In particular a configuration of the rotor can be provided in which the first outer circumferential partial surface of the rotor is a partial surface of a circular cylinder. In an advantageous embodiment of the rotor in which the first outer circumferential partial surface of the rotor is a partial surface of a circular cylinder, it can be advantageously provided that all longitudinal grooves are configured parallel to the rotation axis, thus all longitudinal grooves follow an axial extension. This configuration of the rotor as a rotor with a cylindrical enveloping surface and an axial configuration of the longitudinal grooves arranged at the outer circumferential partial surfaces provides a high level of symmetry and thus among other advantages the advantage of minimizing unilateral loads and thus a partially higher wear. Another advantage of this configuration of the rotor is advantageous fabrication since the longitudinal grooves oriented in an axial extension can be provided for example in a method step of a metal powder method, for example by pressing a rotor press blank into a respectively configured female mold with axial pressure loading.

In one embodiment of the rotor it can be provided for example that the first face is configured as a plane. In another embodiment of the invention it can be provided for example that the second face is configured as a plane in an embodiment in which the first face and also the second face are configured as a plane and simultaneously the first face is configured parallel to the second face the outer circumference partial surface height is identical at each, position of the outer circumference partial surface. A special case of this embodiment is the configuration of the rotor described supra as a rotor with a circular cylindrical enveloping surface.

In the nomenclature that is used herein and in the entire application the term plane is interpreted so that the protrusion profile shall also be included in addition to the base surface. The term plane s therefore not interpreted in the literal sense so that it has to be a perfectly smooth surface. Instead, also the structures shall be perceived as elements of the plane.

In an advantageous embodiment of the rotor it is provided that all longitudinal grooves arranged at the outer circumference partial surface or the outer circumference partial surfaces extend in their entirety along the entire outer circumference partial surface height.

In another embodiment of the rotor it can be provided for example that at least one longitudinal groove has an ellipsoid section shaped, a trapezoid or a rectangular cross section surface with a deviation in that due to the curvature of the outer circumference partial surface instead of a straight base line the recited cross sectional surfaces have an accordingly cambered base line. Furthermore minor deviations from this configuration of the structures, for example in the form of rounded edges shall also be included.

In an advantageous embodiment of the rotor it is provided for example that all longitudinal grooves have one of the recited cross sectional surfaces. By the same token a configuration of the rotor shall be provided which is configured so that a longitudinal groove has a variable cross sectional surfaces along its longitudinal extension.

In an advantageous embodiment it is provided, however, that the cross sectional surface remains uniform along its longitudinal extension and also with, respect to its surface area.

The term cross sectional surface relates to the surface which is formed in a sectional view of the longitudinal groove transversal to its longitudinal extension at the position of the sectional cut up to the transition of the longitudinal groove into the outer circumferential partial surface.

In one embodiment of the rotor it can be provided for example that an intermediary valley which is arranged between two adjacent longitudinal grooves has an ellipsoid section cross sectional surface, a trapezoid or a rectangular cross sectional surface. In another embodiment it can be provided for example that all intermediary valleys which are formed over the surface extension of the outer circumferential partial surface have a circular segment shaped cross section. In another special embodiment it can be provided for example that a first radius of the longitudinal grooves having a circular segment shaped cross sectional surface is identical with a second section of the intermediary valleys of the circular segment shaped cross sections.

Forming the longitudinal groove profile in one of the described exemplary embodiments yields the functional advantage that a lubricant film of the fluid used for cam shaft adjustment is provided during operations of the hydraulic cam phaser, for example of an oil between the longitudinal grooves. The lubricant film thus formed facilitates that a static friction of the outer circumference partial surface relative to an inner surface of the stator of the hydraulic cam phaser is reduced. Furthermore dynamic friction is substantially reduced as well. These effects are additionally augmented in that a portion of the surface of the outer circumference partial surface or of the outer circumference partial surfaces is much smaller which portion comes in touch with another surface, for example an inner surface of a stator of the cam phaser. Another positive effect which is achieved through the reduction of the torque of the dynamic friction are excellent running properties and a significant increase of the adjustment speed.

In a cross section a height is obtained for the partial protrusion configured at the outer circumferential partial surface as a longitudinal groove profile. When viewing the longitudinal groove profile from a bottom of the intermediary valley to its maximal radial extension it can be provided for example that the height is less than 0.05 mm. In another advantageous embodiment it can be provided that the height of the wave protrusion is less than 0.03 mm. In an advantageous embodiment it can be provided for example that the height of the longitudinal groove profile is 0.02 mm or less. In a particularly advantageous embodiment of the rotor it can be provided for example that the height of the longitudinal groove profile is 0.02 mm.

In addition to the advantage of significantly reducing static friction and/or dynamic friction and the resultant significant increase of the adjustment speed of the rotor from a first position to a second position this yields the additional advantage of significant reduction of manufacturing complexity of the rotor. In particular for an optional fabrication step of calibrating the rotor the calibrating is significantly facilitated in particular by the reduced requirements for radially acting forces. In another configuration of the rotor it can be provided that the protrusion profile includes at least a first bar pattern which is arranged at the first face and/or that the protrusion profile has at least a second bar pattern which is arranged at the second face. It can be provided for example that the first bar pattern has at least two bars. Furthermore it can be provided for example that the second bar pattern has at least two bars.

The term bar means that the bar is a protrusion which has a lateral extension in one direction that is at least twice the amount of a lateral extension in a second direction.

It can also be provided that a first bar and a second bar are provided separately from each other. It can be provided for example that a first bar and a second bar are connected with each other and thus transition into each other. In particular it can also be provided for example that a first bar and a second bar transition into each other. In particular it can also be provided that the first bar and the second bar intersect each other.

In another embodiment of the rotor it can be provided for example that the first bar pattern is configured from four bars extending towards each other and transitioning into each other. It is advantageously provided that the first bar pattern is respectively configured from four bars extending towards each other and intersecting each other. This means that each of the four bars intersects at least another of the four bars. In particular this shall not mean that the bars intersect in a common point.

In another embodiment it can be provided for example that the second bar pattern is formed from four bars extending towards each other and transitioning into each other. In particular it can be provided for example that the second bar pattern is advantageously configured from intersecting bars.

In another exemplary embodiment of the rotor it can be provided that the bars of the first bar pattern are formed by an indentation positioned between two adjacent bars of the first bar pattern. It can also be provided for example that the bars of the second bar pattern form an indentation that is positioned between two adjacent bars of the second bar pattern. The term indentation has to be interpreted respectively relative to the outer most extension of the bar in the axial direction.

The formed indentations have the advantage that they can function as a reservoir for example for a lubricant like e.g. oil. Thus, and furthermore through the lower contact surface, for example with an interior of a stator of the cam phaser it can furthermore be achieved that a static friction and/or dynamic friction during a movement of the rotor within the stator is reduced and thus a switching speed of the cam phaser is increased.

In an embodiment of the rotor it can be provided that the first bar pattern has at least one bar which is configured as a linear rise that is essentially coaxial with the rotation axis. The term essentially coaxial linear rise means that the first bar pattern includes at least one bar which is configured as a circle sector wherein a center of the circle which also includes the circle sector is a point which is arranged on the rotation axis. It can be furthermore provided that the first bar pattern includes at least one bar which is configured as a linear rise which is essentially extends in a radial direction from the rotation axis. This means that the bar is configured as a linear rise which is essentially configured as a beam which is oriented radially away from the rotation axis. It can also be provided that the second bar pattern includes one or plural embodiments of the bars recited supra.

Another embodiment of the rotor can provide that the first bar pattern and/or the second bar pattern includes at least one bar which is essentially configured as a linear rise that is coaxial with the rotation axis and also includes a bar which is essentially oriented as a linear rise radially extending from the rotation axis.

Another embodiment of the rotor can be provided in which the first bar pattern fills the entire first face and/or the second bar pattern fills the entire second face.

In an embodiment it can be provided that the first bar pattern includes a number of plural bars which are configured as linear rises that are essentially coaxial with the rotation axis. It can be simultaneously provided that the first bar pattern includes plural bars that are essentially configured as a number of plural linear rises essentially radially extending from the rotation axis. It can be provided in particular that the bars which are configured as linear rises radially extending from the rotation axis are respectively arranged at regular angular intervals from each other. It can also be provided that two adjacent bars that are configured as a coaxial linear rises are respectively configured at an identical distance from the respective next adjacent rise. It can also be provided that the second face includes an identical bar pattern as a first face.

An embodiment of the rotor can be provided in which the first bar pattern and/or the second bar pattern includes the following:
- at least one bar that is configured as linear rise that is essentially coaxial with the rotation axis and/or
- at least one bar configured essentially radially extending from the rotation axis.

In one embodiment of the rotor it can be provided that the first bar pattern includes a plurality of coaxial linear rises and radial linear rises which circumferentially define the first bar pattern at least partially advantageously entirely and/or wherein the second bar pattern includes a plurality of coaxial linear rises and radial linear rises which define the second bar pattern at least partially, advantageously completely circumferentially. This shall have the effect that a number of indentations, advantageously all indentations on the first face and/or on the second face towards an exterior of the body are enveloped by another portion of the bar pattern. This portion of the bar pattern which is formed as defined by the plurality of axial linear rises and radial linear rises thus forms a circumferential rise. This circumferential rise seals all indentations against an exterior for example when the first face and/or the second face contacts an inner surface of the hydraulic cam phaser, for example of the stator and/or of another component of the hydraulic cam phaser. Thus, a leakage of lubricants that are for example disposed in the indentations is reduced in outward direction.

In another embodiment of the rotor it is provided for example that a rise height of the linear rise of the first bar pattern and/or a rise height of the linear rise of the second bar pattern is 1.00 mm or less. The term rise height of the linear rise relates to a distance of a highest point of the first bar pattern to the lowest point of the indentation. In another embodiment it can be provided that a rise height of the linear rise not of the first bar pattern considered overall but only considered locally for a number of bars of the bar pattern is 1.00 mm or less.

In another embodiment of the rotor it is provided for example that a rise height of the linear rise of the first bar pattern and/or a rise height of the linear rise of the second bar pattern is 0.20 mm or less. The term rise height of the linear rise relates to the distance of the highest point of the first bar pattern to the lowest point of the indentation. In another embodiment it can be provided that a rise height of the linear rise not of the first bar pattern considered globally but locally for a plurality of bars of the bar pattern is 0.20 mm or less.

In another embodiment it can be provided for example that a rise height of the linear rise of the first bar pattern and/or a rise height of the linear rise of the second bar pattern is 0.1 mm or more. In particular it can be provided that a rise height of the linear rise of the first bar pattern and/or a rise height of the linear rise of the second bar pattern is in a range between 0.10 mm and 0.20 mm. It is not necessary that each linear rise of the first bar pattern and/or each linear rise of the second bar pattern has an identical height. It can rather also be provided that all rise heights of all linear rises are in the recited range, however individual linear rises have defined different heights. It can be provided in particular for example that the bar pattern has outward terminating, thus circumferential or partially circumferential rises that are slightly higher than the other linear rises. This can assure that leakage is reduced.

In another embodiment it can be provided for example that the rise heights of the linear rises of the first bar pattern are identical over an entire surface of the first face. In another embodiment it can be provided that rise heights of the linear rises of the second bar pattern are identical over the entire surface of the second face. In another embodiment it can be furthermore provided that the rise height of the linear rises of the first bar pattern and the rise height of the linear height of the second bar pattern are identical respectively over the entire first face and the entire second face.

In an embodiment of the rotor it can be provided for example that the first bar pattern and the second bar pattern are configured identical.

In another embodiment it can be provided that the rotor is partially or completely produced by a sintering method. It can also be provided that the rotor is partially or completely made from a sinter metal, a sinter steel, and/or a sinter ceramic material.

Another embodiment of the invention provides a method for producing a rotor with a protrusion profile configured at the surface of the rotor. The method includes at least the following steps:
configuring a rotor including:
a first vane,
a surface including at least a first face, a second face oriented parallel to the first face and a first outer circumferential partial surface of the first vane,
forming a protrusion profile at the surface;
post forming the protrusion profile under pressure after forming the protrusion profile.

It can be provided for example that the rotor is produced by a sintering method. It can be provided for example that the rotor is produced from a sinter metal, a sinter steel and/or a sinter ceramic material.

In one embodiment of the method it can be provided for example that forming the rotor is performed by pressing a powder mix to form a blank. Forming the protrusion profile can be performed for example during pressing by impressing using an accordingly configured press matrix and/or one or plural accordingly configures press plungers.

It can be furthermore provided for example that after forming the rotor and after forming the protrusion profile a sintering of the rotor is performed.

In an optional embodiment of the method it can be provided for example that a post forming the protrusion profile is performed after sintering the rotor.

Another embodiment of the method for producing a rotor can be configured so that the protrusion profile includes at least one longitudinal groove profile arranged at the first outer circumferential partial surface.

Post forming the protrusion profile can be provided so that a calibrating of the longitudinal groove profile is performed.

Calibrating the longitudinal groove profile can be performed for example by pressing the rotor into an accordingly provided calibration matrix.

It can also be provided that the protrusion profile includes at least one first bar pattern with two bars which is arranged at the first face and/or the protrusion profile includes at least a second bar pattern with two bars which is arranged at the second face.

The method for producing the rotor can be configured so that post forming the protrusion profile includes precision embossing a face.

In a rotor which includes at least a longitudinal groove profile which is arranged at least at the first outer circumferential partial surface as well as at least a bar pattern at one of the two faces or also includes at least one bar pattern at both faces it can be provided for example that the calibrating and also the precision embossing is at least partially performed simultaneously.

However, it can also be provided that calibrating and precision embossing is performed sequentially. Sequentially performing the method steps of calibrating and precision embossing can thus be performed in any conceivable sequence.

In one embodiment of the method it can be provided that forming the rotor includes joining the rotor from two separately produced rotor elements. Thus, post forming the protrusion profile is performed after joining the rotor.

An advantageous embodiment of a method which provides a joining of the rotor from two separately produced rotor elements is configured so that the joining is performed after sintering the rotor elements and the post forming of the protrusion profile is performed at least partially simultaneously with the joining.

An advantageous embodiment of the method which includes a joining of the rotor from two separately produced rotor elements is configured so that the joining is performed after sintering the rotor elements and after completing the joining a post forming of the protrusion profile is performed at the joined rotor.

BRIEF DESCRIPTION OF THE DRAWINGS

Further advantageous embodiments and improvements can be derived from the subsequent figures. The details and features that can be derived from the figures are not limited to the embodiments illustrated in the figures. Rather one or plural features can be combined with one or plural features from the description provided supra to form new embodiments. In particular the subsequent descriptions do not define limitations of the scope of the invention but they describe individual features and their possible cooperation. In the drawings.

DETAILED DESCRIPTION OF THE INVENTION

In the figures identical or equivalent components are designated with identical reference numerals. The figures only illustrate exemplary embodiments and do not limit the scope of the invention.

Figure 1:
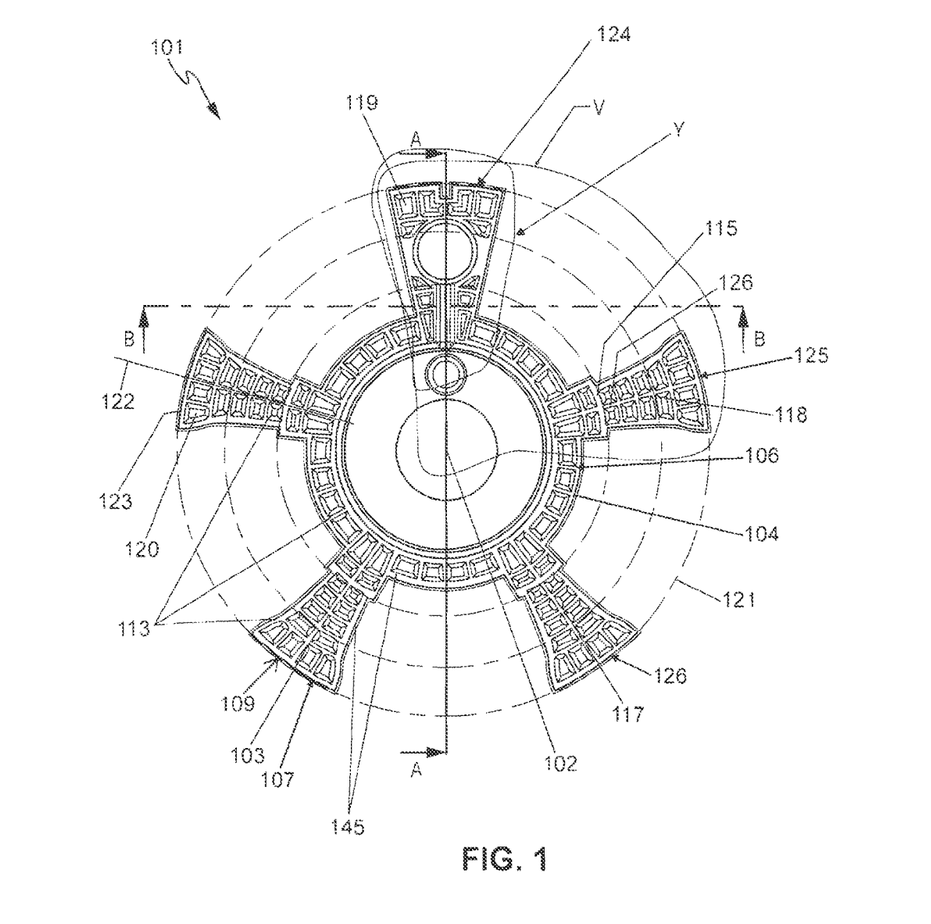
FIG. 1 illustrates a rotor for a cam phaser in a top view of a first face.

FIG. 1 illustrates an embodiment of a rotor for a cam phaser. The rotor 101 is illustrated in a top view of a first face 104. The rotor 101 furthermore includes a first vane 103 and four additional vanes 117, 118, 119, 120. An outer circumferential partial surface 109 of the first vane 103 and the additional respective outer circumferential partial surfaces of the additional vanes 117, 118, 119, and 120 in the illustrated configuration of a rotor are respective partial surfaces of an enveloping surface of a circular cylinder, whose intersection with a face is indicated by the dashed circular line 121. The rotor is provided for a rotation about a rotation axis 102 which intersects the paper plane in a penetration point in a perpendicular direction. The first vane 103 and the four additional vanes 117, 118, 119 and 120 are all essentially oriented radially away from the rotation axis 102. In the illustrated embodiment the illustrated vanes 117, 118, 119 and 120 are respectively configured in the illustrated viewing plane symmetrical to the plane. With respect to the embodiment of the plane 122 this is illustrated for one vane, namely the vane 120. The arrangement of the vanes is uniform in the illustrated embodiment of the rotor 101 in that the symmetry plane of two vanes positioned adjacent to each other is identical for all pairs of two vanes positioned adjacent to each other for all cases so that the five vanes of the rotor form an even sided triangle in the illustrated embodiment.

The angle between the symmetry planes of two vanes positioned adjacent to each other in the illustrated embodiment is therefore 360°/5=72°. The illustrated first face 104 of the rotor 101 shows a protrusion profile 106 which includes a first bar pattern 113 arranged at the first face 104, a longitudinal groove profile 107 arranged at the first outer circumferential partial surface 109 and a longitudinal groove profile 126 arranged at the vane 117, a longitudinal groove profile 125 arranged at the vane 118, a longitudinal groove profile 124 arranged at the vane 119 and a longitudinal groove profile 123 arranged at the fifth vane 120. The first bar pattern 113 includes an exemplary bar which is configured as a linear rise 115 that is coaxial with the rotation axis and furthermore an exemplary bar which is configured as a linear rise 126 radially extending from the rotation axis.

In the embodiment of the rotor which can be derived from FIG. 1 a plurality of additional coaxial rises and radially extending linear rises are configured at the first face 104 of the rotor 101 in addition to the coaxial linear rise 115 and the radial linear rise 126, wherein the linear rises are not provided with individual reference numerals. As can be furthermore derived from FIG. 1 the first bar pattern 113 includes a plurality of bars 145 configured as linear rises which define the first bar pattern completely circumferentially.

Figure 2:
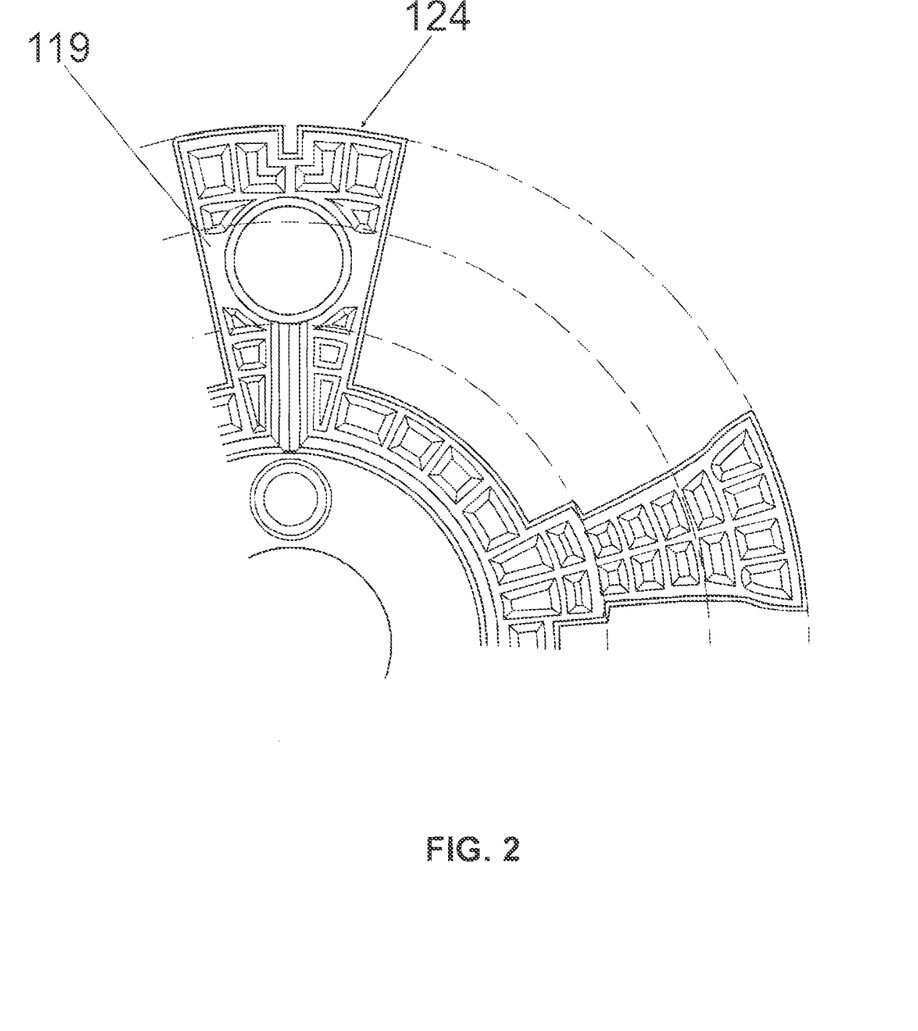
FIG. 2 illustrates a detail of FIG. 1 according to the mark "V"

FIG. 2 includes a detail of FIG. 1 according to the marking "V" from which features illustrated in FIG. 1 can be derived in detail.

Figure 3:
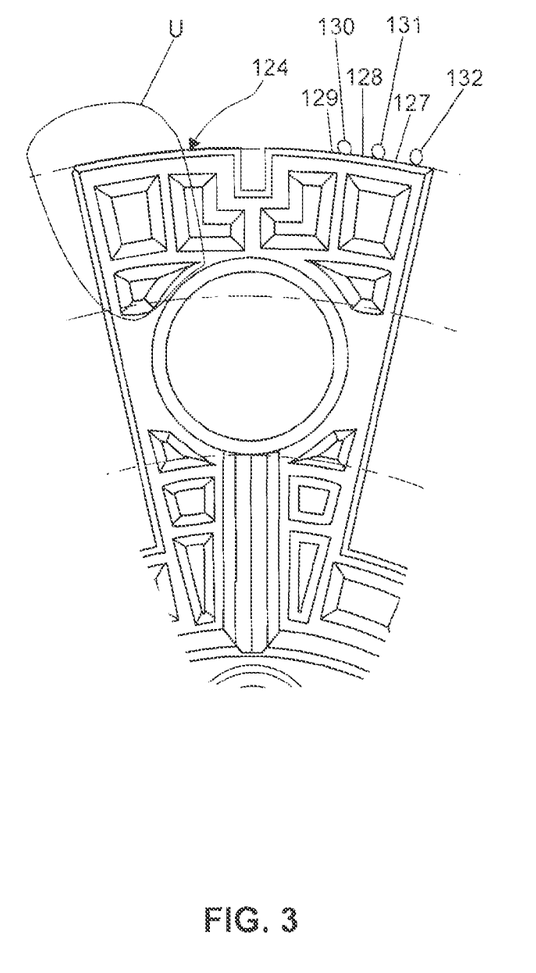
FIG. 3 illustrates a detail of FIG. 1 according to the marking "Y"

FIG. 3 illustrates another detail of FIG. 1 which corresponds to the marking "Y". In addition to the features that can already be derived from FIG. 1 and FIG. 2 it can be derived in particular from the enlargement illustrated in FIG. 3 how a configuration of the longitudinal groove profile thus embodied as the longitudinal groove profile 124 at the outer circumferential partial surface 125 of the vane 119 is provided in a cross sectional view. In an exemplary manner the longitudinal grooves 127, 128 and 129 are designated. An intermediary valley is respectively arranged between the longitudinal grooves. This intermediary valley is configured in the embodiment of the illustrated longitudinal grooves, for example in the embodiment of the intermediary valley between the longitudinal grooves 127 and 128 with a circular section shaped cross section as indicated in the recited embodiment by the circle 130 and the circles 131 and 132.

Figure 4:
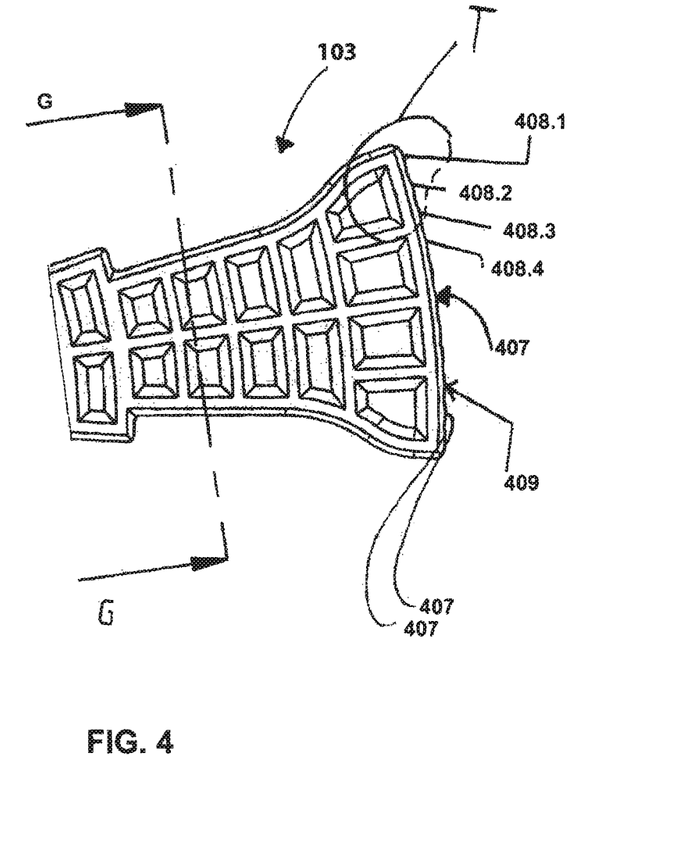
FIG. 4 illustrates a detail of the configuration of a first vane of the rotor according to FIG. 1.

FIG. 4 illustrates a detail from another embodiment of a rotor for a cam phaser. The first vane 103 can be derived in an exemplary manner from the detail. In the illustrated enlargement step it can be derived in particular how the illustrated longitudinal groove profile 407 is configured at the first outer circumferential partial surface 409. For this purpose longitudinal grooves 408.1, 408.2, 408.3, 408.4 and additional longitudinal grooves are arranged over the entire angular extension of the first outer circumferential partial surface 409. Also the illustration of FIG. 4 illustrates longitudinal grooves which include a circular section shaped circumferential surface.

Figure 5:
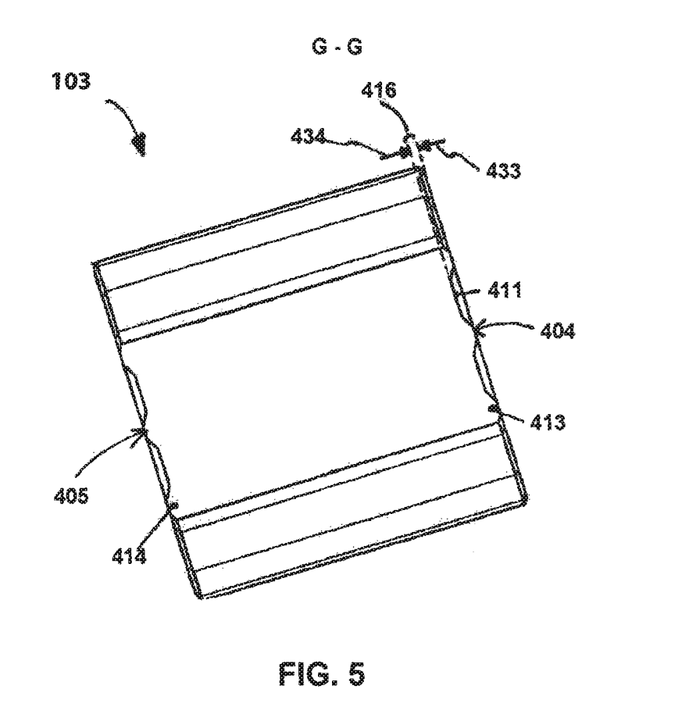
FIG. 5 illustrates a sectional view of the first vane according to FIG. 4 along the line G-G.

FIG. 5 illustrates a cross sectional view of the vane 103 illustrated in FIG. 4 along the viewing axis "G-G". It can be derived from the cross section illustrated in FIG. 5 how a second bar pattern 414 is arranged at a second face 405 that is arranged opposite to the first face 404. The first bar pattern 413 that is arranged at the first face 404 can also be derived from FIG. 5. It can be furthermore derived from FIG. 5 how an indentation 411 is arranged between two adjacent bars, thus embodied in a first bar pattern. The maximum axial extension between a bottom of the indentation 411 and a ridge top of the respective bar represents the protrusion height 416 which is illustrated by two dashed lines and the arrows 433 and 434.

Figure 6:
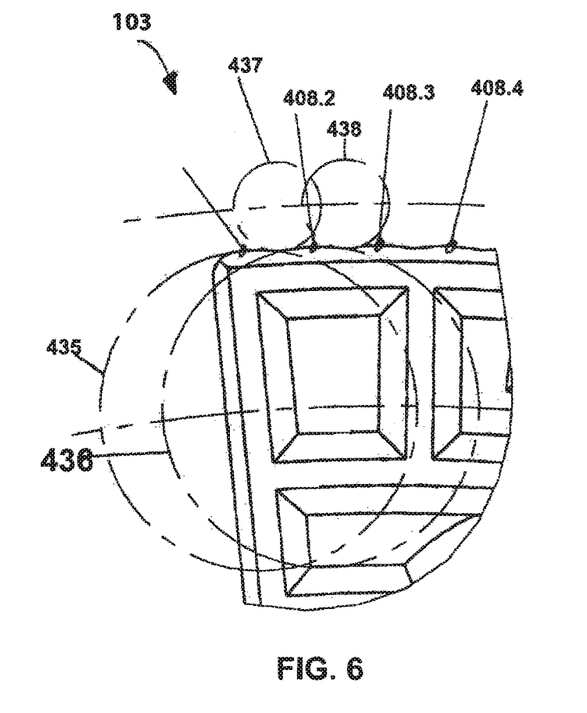
FIG. 6 illustrates a detail of FIG. 3 according to the marking "U"

FIG. 6 illustrates another representation of a detail of a vane 103, wherein the illustrated detail corresponds to the detail "U" from FIG. 3, FIG. 6 illustrates in particular also an advantageous embodiment of the longitudinal groove profile 407 with exemplary longitudinal grooves 408.1, 408.2, 408.3 and 408.4. As illustrated by the circle 435 for the embodiment of the longitudinal groove 408.1 and by the circle 436 for the case of the longitudinal groove 408.2, the longitudinal grooves 408.1 and 408.2 and the remaining illustrated longitudinal grooves 408.3 and 408.4 and also for the non illustrated longitudinal grooves of the vane of the first vane 103 these are longitudinal grooves with a circular section shaped cross sectional surface. In the embodiment illustrated in FIG. 6 also the intermediary valleys between the longitudinal grooves are configured with a circular section shaped cross sectional surface. This is embodied in an exemplary manner by the circle 437 for the indentation arranged between the longitudinal grooves 408.1 and 408.2 and by the circle 438 for the indentation arranged between the longitudinal groove 408.3 and 408.4 in a symbolic manner.

Figure 7:
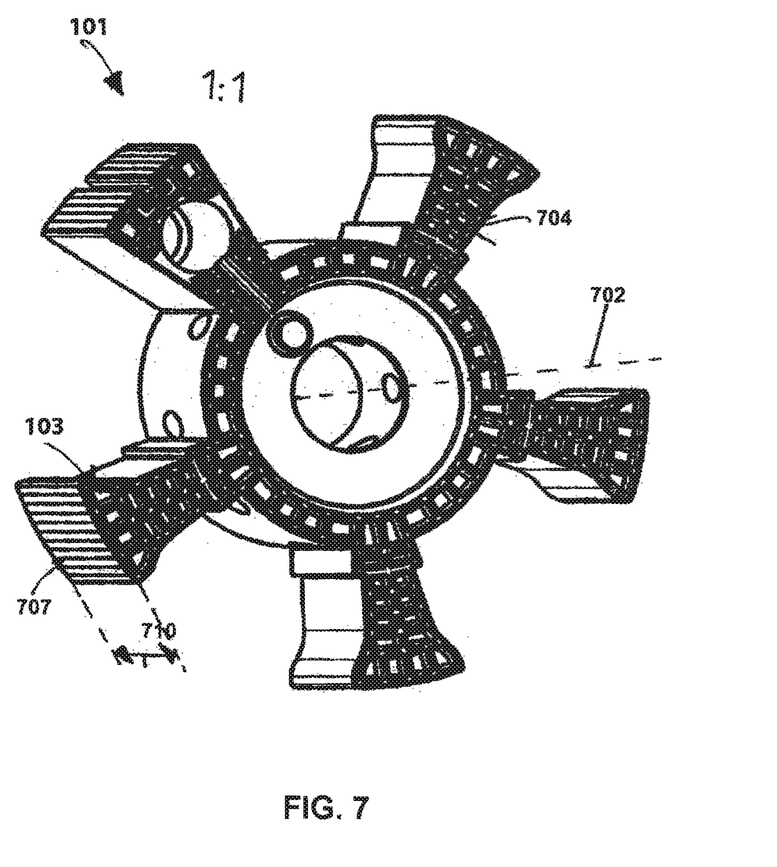
FIG. 7 illustrates a detail of the rotor according to FIG. 1 in a perspective view.

FIG. 7 illustrates a perspective view of the rotor 101. In particular a perspective view of the first face 704 can be derived from the perspective view of the rotor 101. Furthermore the longitudinal groove profile 707 that is provided at two vanes can also be derived from that perspective view. In an exemplary manner the longitudinal groove profile 707 is illustrated for the first vane 103. The rotor 101 is provided for a rotation about a rotation axis 702 which is represented by the dashed line 704 in the perspective view. Furthermore the feature of an outer circumferential partial surface height 710 is illustrated in the view of the rotor 101 according to FIG. 7.

Figure 8:
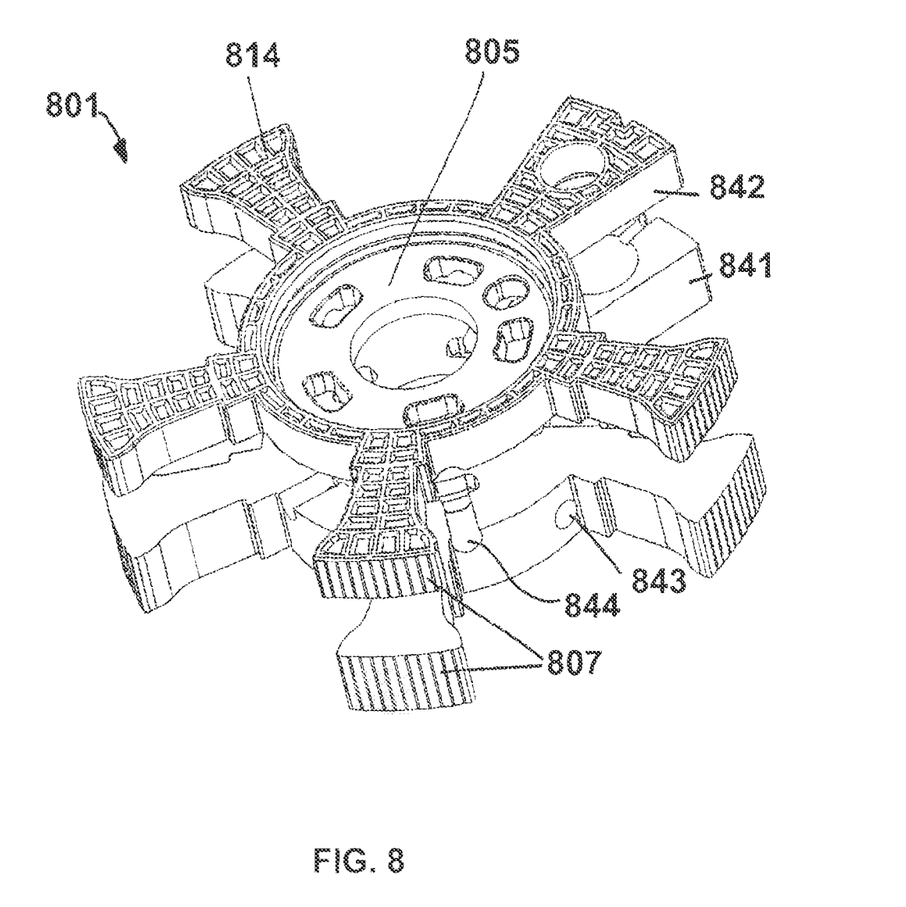
FIG. 8 illustrates a configuration of a rotor for a cam phaser in a perspective view and in an exploded view.

Another embodiment of a rotor 801 can be derived from the illustration of FIG. 8. From this illustration of the rotor 801 it can be derived that FIG. 8 illustrates an embodiment of the rotor 801 which is joined from two separately produced rotor elements. FIG. 8 illustrates a rotor 801 which is joined from a first rotor element 841 and a second rotor element 842. In order to be able to show both rotor elements independently from each other FIG. 8 illustrates an exploded view. It can be derived from the exploded view in particular that the rotor includes fluid channels. Thus, the fluid channels 843 and 844 are illustrated. Furthermore an embodiment of the second face 805 and of the second bar pattern 814 can be derived from FIG. 8.

Figure 9:
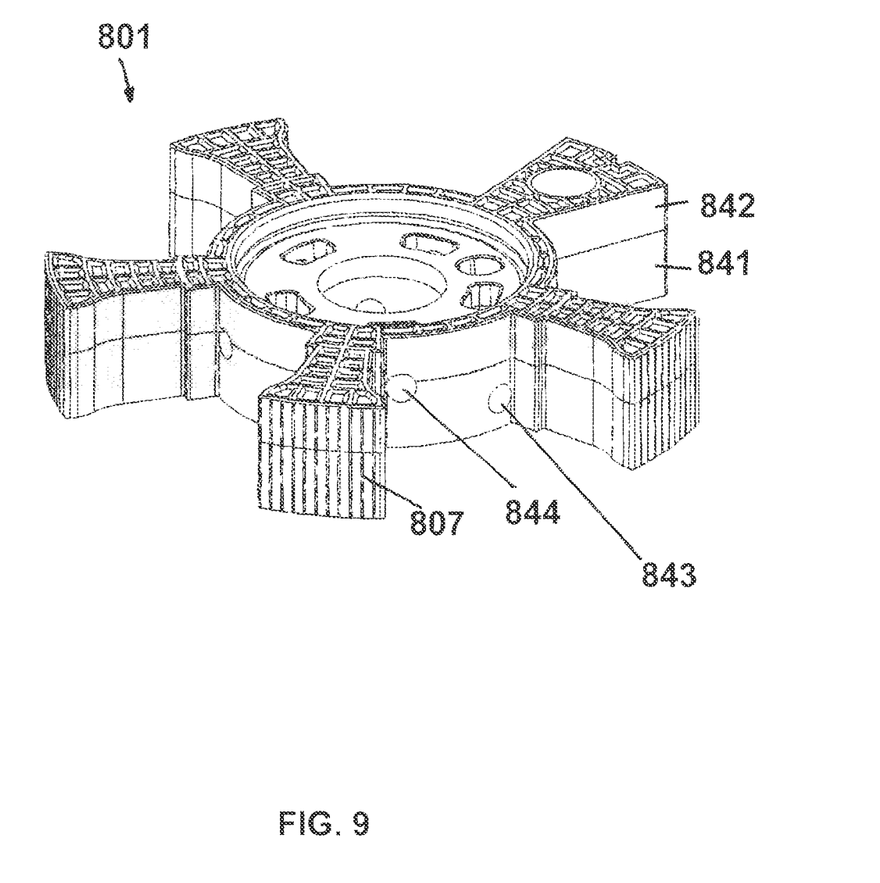
FIG. 9 illustrates a configuration of the rotor for a cam phaser in a perspective view and in a joined view.

FIG. 9 illustrates the embodiment of the rotor illustrated in FIG. 8 in a joined representation.

Figure 10:
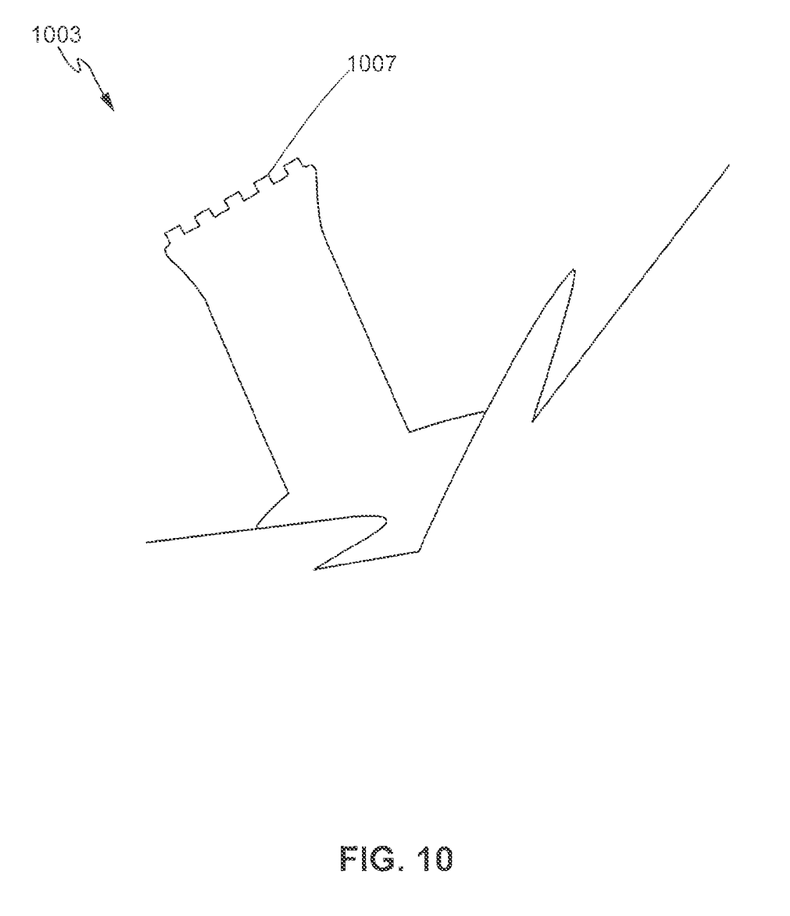
FIG. 10 illustrates another embodiment of the first vane.

FIG. 10 illustrates an embodiment of a first vane 1003 of an embodiment of a rotor in which the longitudinal groove profile 1007 is formed from longitudinal grooves with a rectangular cross sectional surface. Also the intermediary valley arranged between two adjacent longitudinal grooves has a rectangular cross sectional surface. In an advantageous embodiment it can be provided that a protrusion height of the longitudinal grooves is between 0.15 mm and 0.25 mm, and that a distance of two adjacent longitudinal grooves from each other is 1.50 mm.

It can also be provided that a distance of two adjacent longitudinal grooves from each other is 1.50 mm at the most

What is claimed is:

1. A rotor for a cam phaser wherein the rotor is provided for a rotation about a rotation axis and includes at least one first vane essentially radially extending away from the rotation axis,
   wherein a surface of the rotor includes
   at least one first axial face,
   at least one second axial face that is parallel to the first axial face, and
   at least one first outer circumferential partial surface of the at least one first vane,
   wherein a protrusion profile is provided on at the at least one first axial face or the at least one second axial face.

2. The rotor according to claim 1, wherein the rotor is joined from two separately produced rotor elements.

3. The rotor according to claim 1, wherein the protrusion profile includes at least one longitudinal groove profile arranged on the at least one first outer circumferential partial surface and including at least two longitudinal grooves.

4. The rotor according to claim 3,
   wherein at least two longitudinal grooves have a straight extension, or
   wherein at least two longitudinal grooves of the longitudinal groove profile are oriented parallel to each other.

5. The rotor according to claim 3, wherein at least two longitudinal grooves are oriented in a direction that is parallel to the rotation axis.

6. The rotor according to claim 3, wherein at least one longitudinal groove extends over an entire outer circumferential partial surface height.

7. The rotor according to claim 3, wherein at least one longitudinal groove has a circular section shaped, ellipse section shaped, trapezoid or rectangular cross sectional surface.

8. The rotor according to claim 3, wherein at least one intermediary valley that is arranged between two adjacent longitudinal grooves has a circular section shaped cross sectional surface.

9. The rotor according to claim 1,
   wherein the protrusion profile includes at least one first bar pattern with at least two bars which is arranged on the at least one first face, or
   wherein the protrusion profile includes at least one second bar pattern with at least two bars which is arranged on the at least one second face.

10. The rotor according to claim 9, wherein the first bar pattern or the second bar pattern is respectively configured from four bars extending towards each other, transitioning into each other and intersecting each other.

11. The rotor according to claim 9,
   wherein the bars of the at least one first bar pattern form at least one indentation arranged between two adjacent bars of the at least one first bar pattern, or wherein the bars of the second bar pattern form at least one indentation arranged between two adjacent bars of the second bar pattern.

12. The rotor according to claim 9,
wherein the at least one first bar pattern or the at least one second bar pattern includes
at least one bar configured as a linear rise arranged essentially coaxial with the rotation axis, or
at least one bar configured as a linear rise essentially radially extending from the rotation axis.

13. The rotor according to claim 9,
wherein the at least one first bar pattern fills the entire first face, or
wherein the at least one second bar pattern fills the entire second face.

14. The rotor according to claim 9,
wherein the first bar pattern includes a plurality of bars that are configured as linear rises which circumferentially define the first bar pattern at least partially,
wherein the second bar pattern includes a plurality of linear rises which circumferentially define the second bar pattern at least partially.

15. The rotor according to claim 9, wherein a protrusion height of a plurality of linear rises of the at least one first bar pattern, or a protrusion height of a plurality of linear rises of the at least one second bar pattern is 1.0 mm or less.

16. The rotor according to claim 1,
wherein the rotor is partially or completely produced by a sinter method, or
wherein the rotor is partially or entirely made from a sinter metal, a sinter steel, or a sinter ceramic material.

* * * * *

UNITED STATES PATENT AND TRADEMARK OFFICE
CERTIFICATE OF CORRECTION

PATENT NO. : 10,054,210 B2
APPLICATION NO. : 14/926779
DATED : August 21, 2018
INVENTOR(S) : Florian Hentsch It is certified that error appears in the above-identified patent and that said Letters Patent is hereby corrected as shown below:

On the Title Page

Item (73) change the name of the Assignee to "HILITE GERMANY GMBH".

Signed and Sealed this
Fourth Day of June, 2019

Andrei Iancu
*Director of the United States Patent and Trademark Office*